INVENTOR.
CHARLES B. MARETZO
BY
Ward, Neel, Hazelton, Orme & McElhannon
ATTORNEYS Aug. 4, 1964    C. B. MARETZO    3,143,496
MAGNETIC FILTER APPARATUS AND METHOD
Filed Feb. 8, 1962    3 Sheets-Sheet 2

INVENTOR.
CHARLES B. MARETZO
BY
Ward, Neal, Haselton, Orme + McElhannon
ATTORNEYS

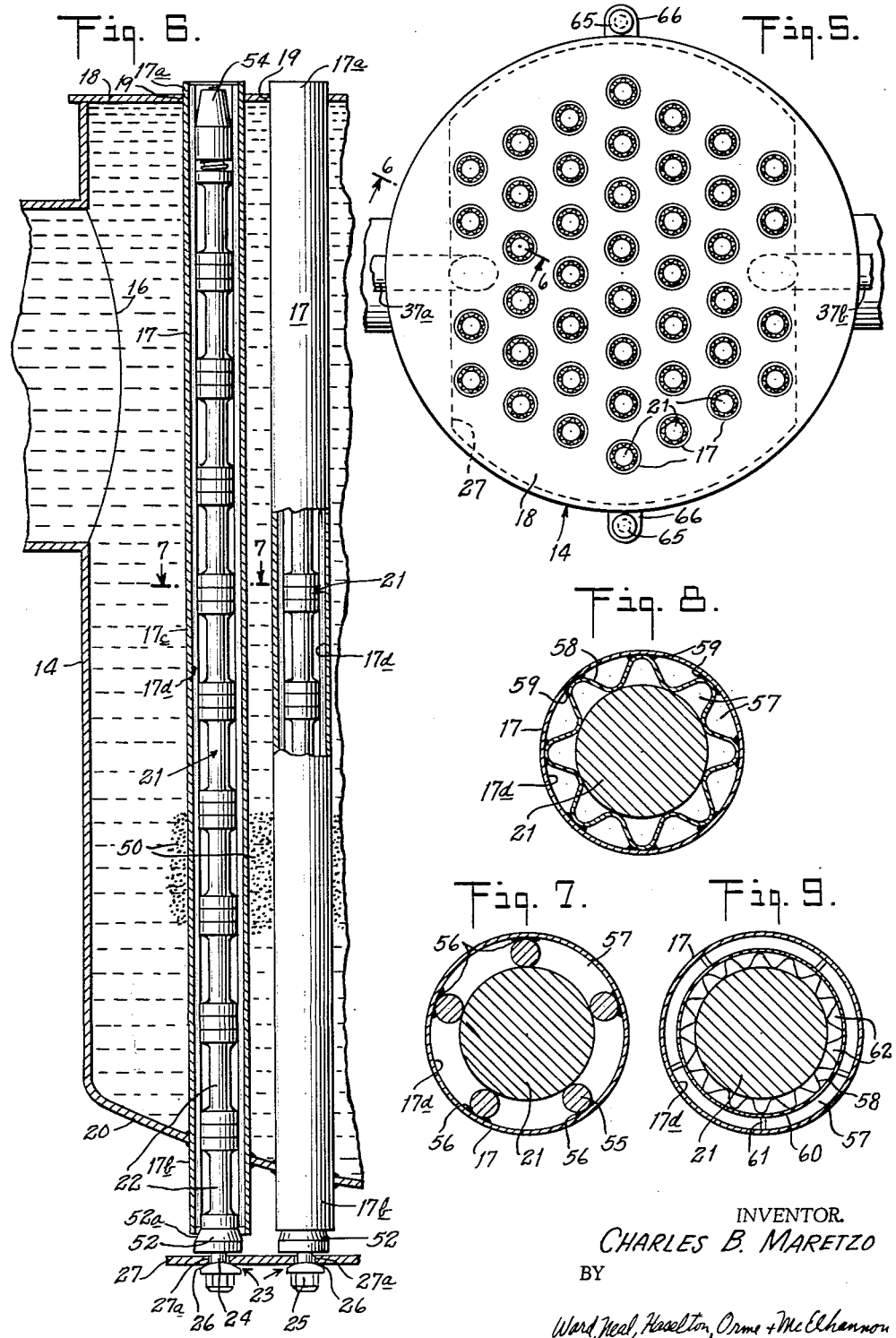

United States Patent Office 3,143,496
Patented Aug. 4, 1964

3,143,496
MAGNETIC FILTER APPARATUS AND METHOD
Charles B. Maretzo, Brooklyn, N.Y., assignor to Consolidated Edison Company of New York, Inc., New York, N.Y., a corporation of New York
Filed Feb. 8, 1962, Ser. No. 171,933
12 Claims. (Cl. 210—65)

This invention relates to the filtering out and removal of particles from suspension in fluids flowing in conduits. More particularly, the invention relates to a magnetic filter apparatus and method for the purpose.

This application is a continuation-in-part of my copending application Serial Number 39,033, filed June 27, 1960, now abandoned.

The present invention was made as a result of a study relating to the filtering out and removal from the line of suspended magnetic and non-magnetic particles in boiler feedwater flowing in main condensate return lines of power generating plant installations. Accordingly, the invention will be described in connection with such application, although it will be understood that it may be used for the removal of similarly suspended particles in other fluids such as lubricating oils, steam, gas and the like, and in other types of conduits.

Magnetic type filters, with which the present invention may be generally classified, are known. They are installed in fluid flow lines and, in general, provide one or more magnet elements in the fluid path for attracting and accumulating magnetic foreign particles, such as iron and iron oxides and the like, which are present in the fluid. The filter apparatus must be periodically cleaned of the accumulated particles. Such cleaning has heretofore required the opening or removal of a cover plate of the filter to permit access to its interior either for the cleaning out of these particles or for the purpose of inspecting the interior to assure that the filter has been effectively cleaned by auxiliary apparatus, such as wash sprays or the like, which auxiliary apparatus is sometimes provided as the primary means for such cleaning.

During normal operation of the filter, the presence of such a covered opening and its attendant packing or gasketing or other sealing means is undesirable where the fluid flowing through the filter is normally under high pressure. In such instances, and even more so where the flowing fluid is at high temperatures, the packing or sealing material is apt to rapidly deteriorate or "blow" in normal use, thereby causing fluid leakage, loss of line operating pressure, or other difficulties. Such tendency has therefore required frequent replacement of the packing or sealing material, and such replacement, in turn, has resulted in higher maintenance costs, a limitation regarding the upper limit of line pressure under which the filter apparatus is reasonably capable of operating, and all too frequent shutdowns of the system. Accordingly, it is an object of the present invention to eliminate these difficulties and costs by providing a magnetic type filter apparatus which incorporates means for achieving truly effective self-cleaning action, and which therefore may be of permanently sealed and rugged construction rather than requiring inclusion of such operable cover plates and their associated gaskets, packing or sealing. As such, the filter apparatus will be capable of operating, and will be substantially maintenance-free in operations under the highest of line pressure conditions. For example, the filter apparatus of the present invention will operate effectively in modern boiler feedwater lines in which the water is flowing under a pressure of about 2400 p.s.i. (pounds per square inch) and a temperature of 900 degrees F. (Fahrenheit).

It is another object of the invention to eliminate the need for auxiliary wash spray lines or the like for washing the accumulated foreign particles from the filter. Moreover, it is intended that the filter apparatus will not require the inclusion of baffles, orifice plates, pole pieces or other means which are more often provided to insure effective filtering action, sometimes with accompanying drop of line pressure or reduction of the volume of flow capable of being handled by the filter, nor the inclusion of undesirable moving components. The elimination of all of these features of prior magnetic filters will further substantially reduce initial cost and maintenance. In addition, such will substantially eliminate any drop in line pressure as might otherwise be attributable to the filter, and will cause the filter to be capable of handling very large volumes of fluid such as might be encountered in a modern boiler feedwater line which carries as much as three million (3,000,000) pounds of water per hour to the boiler.

It is a further object of the present invention to eliminate secondary magnetization systems or chambers as are found in some prior known filters of the type for the depolarization of the iron components. Their complete elimination results in more direct and efficient filtering of oxides because of the greater flexibility afforded by the present invention in the arrangement of the magnet elements.

In addition, magnetic type filters have not heretofore been found generally acceptable for use in high temperature applications due to the known characteristic of commonly used permanent magnet materials to lose their magnetism upon temperature cycling from the relatively high temperature of their normal operation down to lower temperatures, as occurs when the filter is taken off the line for cleaning or as may occur under varying conditions of line flow which may involve temperature changes. For example, one ordinarily acceptable magnet material of aluminum-nickel composition will lose approximately two percent (2%) of its magnetism each time it is cooled from a temperature of about 500 degrees F. to room temperature. After about fifty of such coolings the material is no longer magnetic. Moreover, when the same material is cooled from approximately 1100 degrees F. to room temperature it will lose all of its magnetism in the single cooling.

Where electromagnets are used, the maximum temperature of filter operation must be even more limited since presently known and suitably economical insulation materials, which cover the wire conductors of the magnet, deteriorate at temperatures exceeding about 350 degrees F.

Thus, although magnetic type filters are highly effective in their ability to filter out magnetic particles as well as an appreciable amount of non-magnetic particles from flow lines, they have been considered as being limited in application to conditions of operation involving temperatures of less than 500 degrees F. and moderate line pressures. It has not been understood how magnetic type filters can be adapted for extremely high temperature operation, especially under circumstances which may involve repetitious cooling and reheating of the filter, and for substantially trouble-free use in high pressure flow lines. It is an object of the present invention to provide a magnetic filter apparatus which is adapted for normal operation under such high temperature and high pressure conditions.

Briefly describing the invention in a presently preferred embodiment, the magnetic filter apparatus is installed in the main condensate return line of a conventional steam generating system at a location between the usual high pressure preheater and the steam generator or boiler. At this location in the steam cycle, the main condensate return line is alternately, and perhaps more frequently referred to as the boiler feedwater line. Two magnetic type filters are used, one being situated in a by-pass line on standby for use when the primary magnetic filter is to be cleaned so as to prevent interruption of the operation of the power system at such time. A three-way valve is located at the junction between the main flow line and such by-pass line at the location ahead of the two filters, the valve being operable to shunt the condensate through the standby filter when the primary filter is to be cleaned. A check valve is situated both in the main line and in the by-pass line, on the opposite or side towards the boiler of each of the two filters, each check valve operating in conjunction with the three-way valve.

Each of the magnetic type filters comprises a housing, of stainless steel or the like to resist corrosion or magnetic polarization, which is of all welded construction such as will provide a permanently enclosed housing. The housing has an inlet opening and outlet opening at opposite sides to which the main flow line will be attached to cause the fluid to flow through the filter. The housing also has one or more drain openings at the bottom to be opened when cleaning the filter unit of the accumulated foreign particles. Preferably, the housing has a bottom which tapers towards such drain openings.

A plurality of non-magnetic hollow tubes are permanently attached to extend vertically within and across the enclosed housing, each of the tube ends being open and extending to the exterior of the housing for a purpose as will be described. The tubes are preferably of stainless steel as will provide a smooth exterior tube surface. A magnet rod, preferably formed by a tandem arrangement of permanent magnets, extends within each of the hollow tubes so as to create a magnetic field surrounding the exterior of the tubes and within the path of the fluid as it flows through the housing. Thus, foreign particles within the fluid which are subject to magnetic attraction will be attracted to, and will collect on the exterior surfaces of the non-magnetic tubes. The accumulation of magnetic foreign material will incidentally serve in the nature of a screen-type filter whereby an appreciable quantity of non-magnetic foreign particles will also be filtered from the flowing fluid.

To provide for high-temperature operation of the filter, and to substantially eliminate the effects of such high temperature on the magnet rods as previously mentioned, in the preferred embodiment each of the tubes is adapted at its interior surface to provide an air space surrounding the magnet rod which it contains during normal filter operation. In one preferred form of such adaptation of the tubes, a plurality of longitudinally extending and non-magnetic slide rods are attached to the interior walls of the tubes. The slide rods are preferably of non-metallic material to minimize heat conduction. In another embodiment, a concentric but longitudinally corrugated second or interior tube is attached to the interior wall of each of the primary tubes, such tube also being non-magnetic, and preferably non-metallic. In either arrangement, the magnet rods will have a minimum of contact only with the slide rods, or the interior corrugated tube, and the radial depth of the slide rods, or of the interior tube corrugations, will provide space between the magnet rod and the interior wall of the primary tube through which air can flow, either by natural or forced draft. Forced draft is provided by a suitable blower mounted within an air directing cone which is mounted adjacent the open top ends of the filter tubes.

Where extremely high-temperature operation is encountered and therefore additional cooling is required, another embodiment provides an intermediate tube disposed between the interior wall of the outer or primary tube and the corrugated interior tube. The intermediate tube is of plain configuration and is attached in spaced relation to the interior wall of the primary tube, as by relatively thin spacer rods or beads of weld. The corrugated interior tube is attached to the interior wall of the intermediate tube. Air can be blown through the space between the primary outer tube and the intermediate tube, and water or similar cooling fluid can be circulated in the interstices between the intermediate tube and the corrugations provided by the interior tube. In this way, the contained magnet rod will be even more effectively insulated from the effects of the high temperature of the system in which the filter unit is installed.

All of the vertical magnet rods are attached at their lower ends to a plate or the like so as to provide for simultaneous withdrawal of the magnet rods from all of the tubes during the filter-cleaning operation. To account for possible unevenness in the withdrawal, each tube is connected by a universal joint to the withdrawal plate. The upper ends of the magnet rods are free, standing within the non-magnetic tubes.

An essential feature of the invention is that for filter cleaning purposes the magnet rods are mounted for withdrawal movement in direction towards the bottom of the housing. Thus, the magnet rods will be situated beneath the housing after their withdrawal. To prevent the free, upper ends of the magnet rods from riding completely out of the non-magnetic tubes during the withdrawal operation, limit stops are provided between the housing and the withdrawal plate. Of course, in the preferred arrangement, a motor or hydraulic means such as an air cylinder are provided for moving the magnet rod withdrawal plate in a vertical path.

To sense when the optimum amount of accumulation of foreign particles on the filter tubes has been reached, a differential pressure transmitter is attached across the filter in manner similar to that described in my referred to copending application. In this arrangement a sensing device extends into the main flow line at each location adjacent the inlet and outlet openings of the filter housing for the purpose of detecting the slight but significant pressure drop in the flowing fluid as will be due to an appreciable accumulation of particles on the filter tubes. When the sensing devices detect that a differential in pressure has been reached as would indicate an optimum accumulation of particles, the differential pressure transmitter initiates a sequence of automatic filter cleaning operations. Alternatively, the cleaning operations can be initiated manually at fixed time intervals.

In the filter cleaning cycle the flowing condensate is shunted through the stand-by filter by appropriate operation of the three-way filter inlet valve. The outlet check valve of the filter to be cleaned will then automatically close against the tendency for reverse flow in the line, leaving that filter filled with now stilled water which was previously flowing therethrough. Of course, the outlet check valve of the stand-by filter will automatically open as the flow proceeds through that valve. The two drains at the bottom of the filter to be cleaned are then opened, and the magnet rods are withdrawn at a rate approximating the rate of discharge of the water through the drains. Alternatively, the magnet rods may be withdrawn prior to opening the filter drains. In either case, it will be found that the accumulated magnetic particles will slide downwardly, responding to the magnetic attraction of the moving magnet rods, along the exterior surface of the non-magnetic tubes as the magnets are withdrawn, and will pass out of the housing with the flow of the contained water out of the drains. The cleaning action is so efficient (tests show 94% cleaning efficiency) that no further cleaning, or even inspection of the interior of the housing is required.

After the housing has been drained, its drain openings are closed and the magnet rods moved upwardly to their normal positions within the tubes of the filter. The filter may then be placed back in normal service by appropriate operation of the three-way valve so that the main flow will be redirected through the now clean filter unit. These operations may also be automatically performed in timed sequence with the other operations, if desired.

These and other objects, features and advantages of the invention will become more fully apparent from the following detailed description thereof, when taken with reference to the accompanying drawings in which:

FIGURE 5 is a still further enlarged plan view in cross section of the apparatus as shown in FIGURES 2 and 3, the view taken at lines 5—5 of FIGURE 3;

FIGURE 6 is a still further enlarged and fragmentary view of the apparatus of the previous showings, the view taken at lines 6—6 of FIGURE 5;

FIGURE 7 is an even further enlarged view in cross-sectional plan view, taken at lines 7—7 of FIGURE 6, showing the details of a filter tube of the apparatus in accordance with a preferred embodiment thereof;

FIGURE 8 is a view similar to FIGURE 7, but showing the filter tube in a modified form; and FIGURE 9 is a view similar to the FIGURES 7 and 8 showings, but illustrating still another modified form of filter tube.

Figure 1:
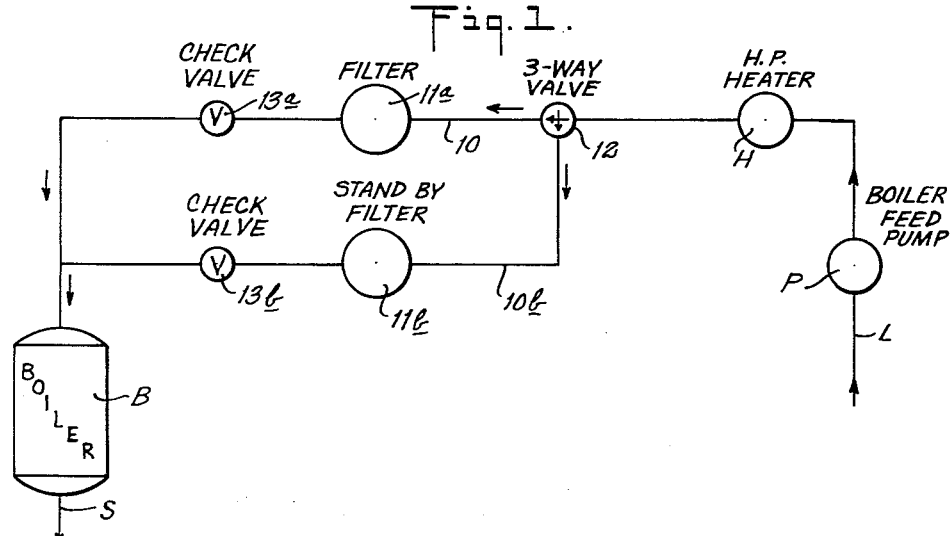
FIGURE 1 is a diagrammatic illustration of the relevant portion of a conventional steam generating system which incorporates filter apparatus in accordance with the invention.

Referring to the fragmentary portion of a conventional steam power system as illustrated by FIGURE 1, there is shown a boiler feedwater line L which is actually the main condensate return line of a modern system. Main steam condensate from the main condenser (not shown) is therein returned to the steam generator or boiler B to be regenerated into steam, whereupon it flows in the main steam line S to the main engines of the system (not shown) for powering the same. In one modern system, the diameter of the feedwater line L is about 16 inches, and the rate of flow of the condensate through the line is about 2½ to 3 million pounds per hour, or roughly in the range of 5000 g.p.m. (gallons per minute). The flowing condensate is pumped by boiler feed pump P under pressure of about 2400 p.s.i. and, in its travel towards boiler B, the condensate will be heated to a temperature of anywhere between 900 degrees F. and 1100 degrees F. in the high pressure heater H.

Within the line L, and situated between the heater H and boiler B, are two magnetic type filter units 11a and 11b of identical construction, as will be described. The filter unit 11a may be considered the primary unit, it being located in the normal flow segment 10 of the line L. The filter unit 11b may, for present purposes, be considered a standby filter unit, it being located in a by-pass segment 10b of the line L.

At the lead-in junction between line segment 10 and by-pass segment 10b of line L there is a conventional three-way valve 12 which serves as an inlet valve for both of the filter units 11a, 11b. As indicated by the arrowheads shown on the valve 12, when the valve is in one position of its operation, all of the condensate or feedwater in line L will flow only into line segment 10 and, hence, through the filter unit 11a, whereas when the valve is in its other position of operation, all of the feedwater will be directed into by-pass segment 10b to flow through the filter unit 11b. A conventional check valve 13a is situated in line segment 10 at the outlet side of filter unit 11a, and a similar check valve 13b is situated in by-pass segment 10b at the outlet side of filter unit 11b. These check valves 13a, 13b serve as the outlet valves of the respective filter units and permit through flow in only one direction, that being towards the boiler B. Thus, when by the aforementioned positioning of three-way valve 12 the feedwater is directed through filter unit 11a, the check valve 13b will be closed so as to prevent the feedwater from "backing" into the filter unit 11b, the check valve 13a being automatically maintained in its open position by the flow of feedwater through line segment 10. Similarly, when the feedwater is directed through standby filter unit 11b, check valve 13a will be closed and check valve 13b will be automatically opened by the flow.

Figure 2:
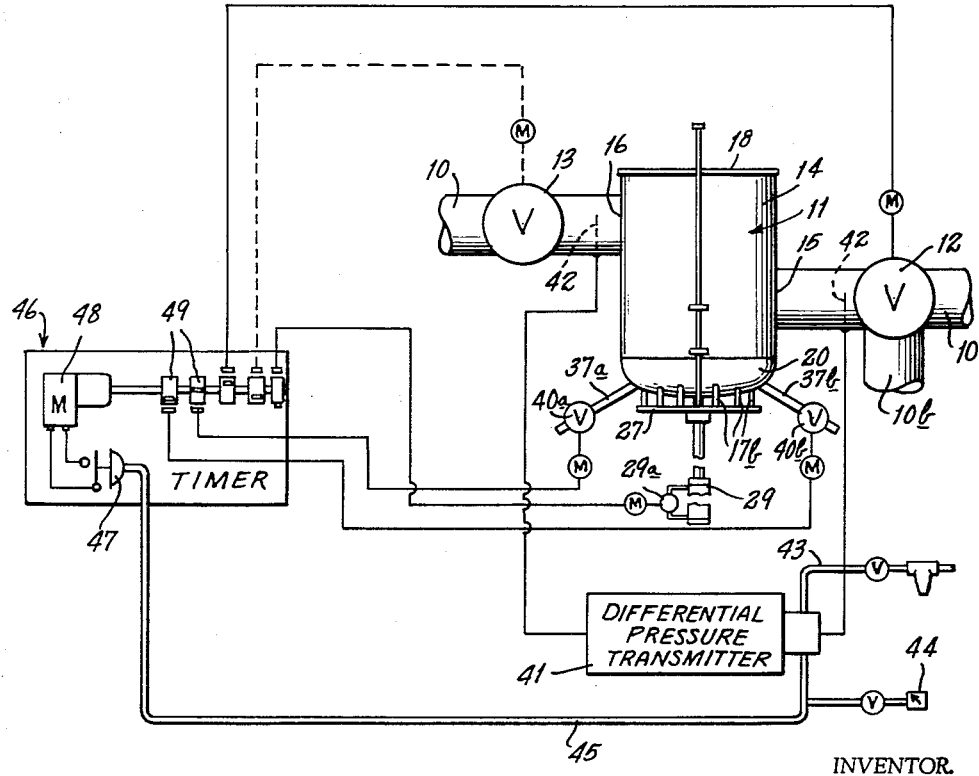
FIGURE 2 is an illustration of a filter apparatus made in accordance with the invention as it would appear during its normal line operation, its automatic control system being shown diagrammatically.

Referring now to certain details of the filter apparatus as shown in FIGURE 2, it will be understood that the filter unit 11 which is there illustrated is representative of either of the filter units 11a or 11b as shown in FIGURE 1. Similarly, the valve 13 of FIGURE 2 will be understood as representing the outlet check valve which is associated with any filter unit 11. Of course, the filter unit inlet valve, which is the three-way valve shown in FIGURE 1, is correspondingly indicated by reference numeral 12. In a preferred embodiment, each of the valves 12, 13 is "motorized," or automatically operated in response to actuation of an associated motor as indicated by reference character M above each valve.

The filter unit 11 comprises a stainless steel housing 14 providing a fluid path between its inlet and outlet openings, as indicated by numerals 15 and 16, respectively, at opposite sides thereof. The inlet opening 15 is located near the bottom, and the outlet opening 16 is located near the top of the housing 14, as shown. Attached to extend vertically within the housing 14 are a plurality of filter tubes 17 (see FIGURE 6) which are also made of non-magnetic material such as stainless steel, and which are appropriately arranged and spaced within the path of the feedwater to be filtered (see FIGURE 5). The tubes 17 project outwardly through the bottom 20 of the housing 14 at their respective lower ends 17b which are open so as to expose the tube interiors to the atmosphere. In the embodiment illustrated in FIGURE 2, it may be understood that the upper ends 17a (not shown) of the tubes are attached as by welding to the interior surface of a housing enclosure plate 18 which is, in turn, fully welded to the top of the housing. Thus, in this embodiment, which is suitable for operation within low temperature ranges, the tubes are sealed at their upper ends (not shown) against entry of the feedwater, and the housing 14 itself becomes a totally enclosed and sealed path for the feedwater. As will be hereinafter described, in other embodiments of the invention, the tube upper ends 17a are not sealed, but are also open to the atmosphere.

The bottom 20 of the housing is tapered as shown towards drain lines 37a and 37b which, together with their respective drainage valves 40a and 50b, are attached as by welding to the bottom 20. Drainage valves 40a, 40b are preferably motorized as indicated by the reference character M which is associated with each of the same.

Figure 4:
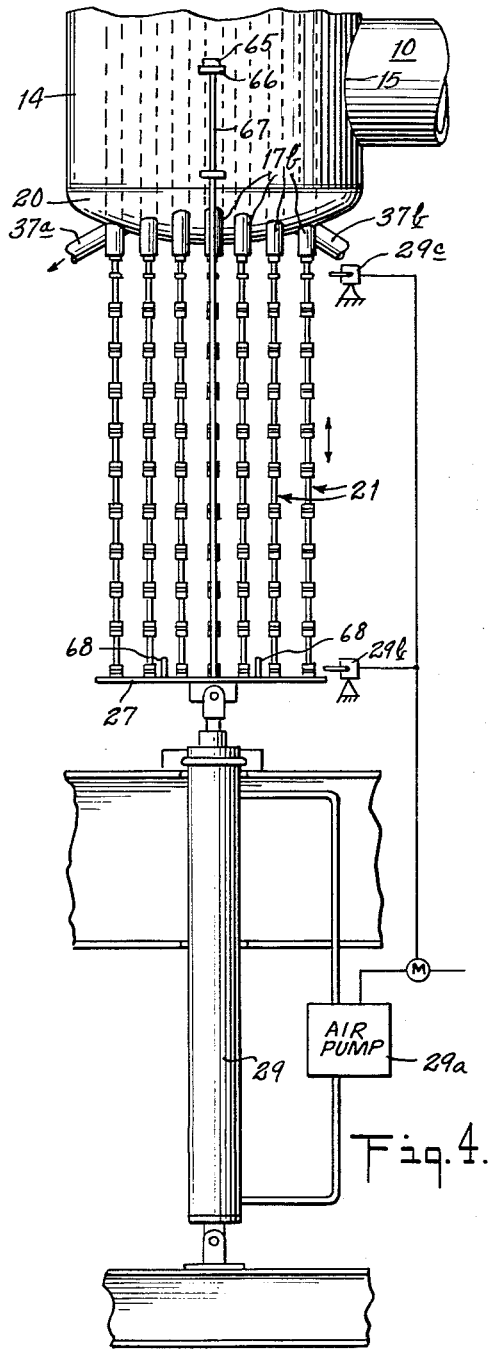
FIGURE 4 is a fragmentary similarly enlarged illustration of the filter apparatus of either FIGURE 2 or FIGURE 3 as it would appear during the filter cleaning operation.

Referring briefly to FIGURES 4–6, it will be seen that normally situated within each tube 17 there is a magnet rod 21 for establishing a magnetic field which permeates and surrounds the non-magnetic tube and which will attract magnetic particles as are suggested by reference numeral 50, such as iron, iron oxides and other iron-bearing materials which are in suspension in the boiler feedwater, so as to filter them out as they attempt to pass through the filter, and cause their collection and accumulation on the exterior surface 17c of each tube. It is further seen that the magnet rods 21 are isolated by the tubes 17 from contact with the boiler feedwater to be filtered, the feedwater flowing around, but not into the tubes 17. In the illustrated embodiment, magnet rods 21 are formed by a plurality of bell-shaped permanent magnets 22 which are arranged in a stack and attached together as by a rod 24. Alternatively, electromagnets might be used. The magnet rods 21 are slidable within the filter tubes 17 so that they may be easily withdrawn and reinserted, as indicated by the arrows in FIGURE 6, at times when the filter unit 11 is to be cleaned of the accumulation of filtered out particles. Moreover, they are each attached by universal joint means, generally indicated by reference numeral 23, to a common withdrawal plate 27 so that, by lowering the plate 27, all of the magnet rods 21 may be simultaneously withdrawn from all of the tubes 17 to a position below the housing 14 as illustrated in FIGURE 4. After the filter unit has been cleaned, the magnet rods 21 will be returned to their normal positions within the tubes 17 as seen in FIGURE 6. Hydraulic hoist means, such as an air cylinder 29, are provided for the purpose.

Figure 3:
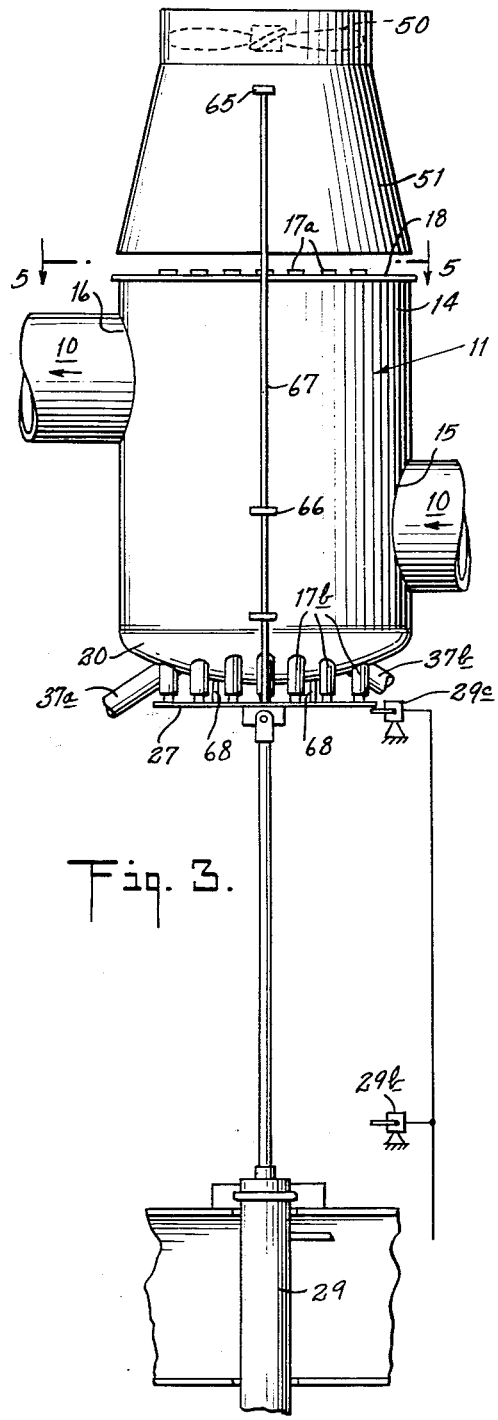
FIGURE 3 is a somewhat enlarged fragmentary view of a filter apparatus similar to that shown in FIGURE 2, but which is somewhat modified.

In FIGURE 5 there is shown a filter unit arrangement wherein forty-two of the filter tubes 17 and their associated magnet rods 21 are disposed vertically across the fluid path through the filter housing 14, the latter being about 3′ in diameter. However, the number of filter tubes may be varied in accordance with the anticipated amount of contamination of the flowing fluid by magnetic particles, the amount of screening action which will be desired to filter out a desired percentage of non-magnetic particles as determined by the spacing of the tubes, and the practical maximum diameter of the housing 14 which may affect flow characteristics through the filter, and other factors. For example, in one presently contemplated installation, 50 filter tubes will be disposed within a housing which is also 3′ in diameter.

Where somewhat high fluid temperatures such as above about 200 degrees F. are to be encountered, each of the filter tubes 17 should be open at both of its ends 17a, 17b to the exterior of the housing 14 as shown in FIGURE 6. Because of the spacing as is provided, by means as will presently be described, between each magnet rod 21 and the interior of its associated filter tube 17, the open ends 17a and 17b of each filter tube 17 will permit natural air draft ventilation between the magnet rod 21 and the interior surface 17d of the filter tube. Provision for the filter tubes to be open to the atmosphere at both of their respective ends is made by passing each of the tubes 17 through appropriately formed holes 19 in the upper tube sheet or enclosure plate 18 and welding the tubes thereto, as shown, and by similarly welding each tube where it passes through the bottom 20 of the housing, as is also shown in FIGURE 6.

Where higher temperatures, such as above about 500 degrees F. are to be encountered, an axial blower 50 is mounted above the housing 14 in alignment with the open upper ends 17a of the filter tubes 17, for the purpose of providing forced draft ventilation therethrough. The blower 50 is mounted as shown in FIGURE 3, within an air directing cone 51 for greater efficiency as will be understood. The blower 50 may operate in either direction, either drawing air which enters the tubes 17 at their lower ends 17b upwardly through the tubes, or blowing the air downwardly through the tubes, in which case the air emerges at the lower ends 17b of the tubes. Referring briefly to FIGURE 6, it is seen that a tapered spacer piece 52 is provided at the lower end of each magnet rod 21 where it is connected to the withdrawal plate 27, and it will be understood that the spacing between the tapered surface 52a of the spacer piece and the extreme lower end of each tube 17 will be sufficient for the purpose of permitting air either to enter or to emerge from each tube 17. Moreover, where downwardly directed forced air ventilation is employed, a tapered end piece 54 at the upper end of each magnet rod 21 will assist in directing the flow of air evenly around the magnet rod.

Reference will now be made to FIGURES 7–9 wherein the details of construction of the filter tube 17 in several of its embodiments is illustrated. In each of the figures, the tube 17 is shown as it would appear with a magnet rod 21 disposed therein for normal operation of the filter. As previously mentioned, it will be understood that each magnet rod 21 is slidable in axial direction with respect to its associated filter tube 17.

To promote such slidable movement, and to peripherally space each magnet rod 21 from the interior surface 17d of its associated filter tube 17 for cooling purposes, FIGURE 7 shows a plurality of longitudinally extending spacer elements 55 which are attached, as indicated at 56, to the interior wall or surface 17d of tube 17. In the embodiment shown, the spacer elements 55 are in the form of rods having circular cross-section. To minimize the conduction of heat through the tube 17 to the magnet rod 21, it is preferred that the spacer elements 55 be of a non-metallic insulating type material and that the bonding means as is indicated at 56 will be of an appropriate type to bond such material to the stainless steel material of which the tube 17 is made. Alternatively, since the spacer elements 55 are shaped in cross-section to present a minimum area of contact with magnet rod 21, the elements 55 might be made of stainless steel, in which case the bonding means as indicated at 56 would take the form of welding. The spacer elements 55 should have a smooth surface such as will facilitate the intended slidable movement of the magnet rod 21. It is seen that the thickness of the spacer elements 55, as measured in radial direction with respect to the tube 17, is such as will provide a suitable air space 57 surrounding the magnet rod 21 and extending to the tube surface 17d.

An alternative spacer element means is shown in FIGURE 8. In this modification, which is suitable for use in applications involving temperatures of fluid flow up to about 600 degrees F., a stainless steel interior tube 58 of corrugated cross-sectional configuration is disposed concentrically with, and is attached, as by welding 59 or the like, to the interior surface 17d of each filter tube 17. The corrugations present a suitable slide surface for the magnet rod 21, as well as suitable space 57 surrounding the magnet rod 21 for the introduction of air.

For temperature applications above 600 degrees F., additional cooling may be required. Thus, a construction of the tubes 17 is contemplated which would provide not only for air cooling, but also for liquid cooling by a coolant such as water or oil surrounding the magnet rod 21. A presently preferred construction for this purpose is shown by FIGURE 9 wherein an intermediate tube 60, of stainless steel or other suitable non-magnetic material, is disposed concentrically and in spaced relation with respect to the interior surface 17d of the primary or outer tube 17, and to which is attached the interior tube 58 which has corrugated configuration similar to that shown in FIGURE 8. The intermediate tube 60 is held in spaced relation to the outer tube 17 by thin supports, such as indicated at 61, which may be attached between the respective tubes at point locations along their lengths. Thus, they are such as will not conduct a significant amount of heat to the intermediate tube 60. It is presently intended that the space 57 between tube 17 and intermediate tube 60 will be for the introduction of cooling air, and that the spaces as indicated by reference numeral 62 between the intermediate tube 60 and the interior tube 58 will be for the circulation of a liquid coolant such as water. In the latter instance, suitable means (not shown) will be provided for the introduction and circulation of the liquid coolant within the spaces 62.

Referring again to FIGURE 6, the universal joints 23 which provide the connections between magnet rods 21 and the common withdrawal plate 27 will account for minor inaccuracies and any unevenness attendant the withdrawal and reinsertion of the magnet rods during the filter cleaning operation. Each universal joint 23 is conveniently provided by the means which form the connection between any magnet rod 21 of the withdrawal plate 27. The rods 24, on which the individual magnets 22 are mounted, are passed through openings 27a of the withdrawal plate 27, which openings 27a have slightly larger diameter than that of the rods 24 to provide a loose fit. The ends of the rods 24 are threaded (not shown) to receive the spacer piece 52 and an opposing attachment bolt 25. The bolt 25 is provided with a spherically convex surface 26 at its end which is adjacent the withdrawal plate 27 in a somewhat loose fit. Thus, such loose fitting connection as is provided will effect a universal joint 23 having sufficient latitude of movement for the intended purposes.

Continuing with a description of the filter apparatus as shown in FIGURE 2, a differential pressure transmitter 41 is installed as illustrated to sense the pressure differential across the filter unit 11, the pressure sensing instrumentalities 42 thereof being inserted in the feedwater line segment 10 adjacent the filter inlet and outlet openings 15 and 16. The differential pressure transmitter may be of an air-operated type, connected for operation to a suitable air supply line 43. The difference in fluid pressure across the filter may be read on a recorder 44, if provided, but in any event the output air pressure in the line 45 of the differential pressure transmitter will vary in accordance with the change of pressure of the feedwater in the line segment 10, which pressure change is caused by an accumulation of filtered out particles 50 on the tubes 17 which blocks the water flow to some extent. This output air pressure in the line 45 will increase proportionately with the buildup of filtered out particles 50 on the tubes 17 and, when the pressure drop in the line segment 10 reaches a predetermined level, it will signal the necessity for initiating a sequence of filter cleaning operations. In the preferred embodiment of the invention, a predetermined level of output air pressure from the differential pressure transmitter will be utilized to actuate a pneumatically responsive switch 47 on a timer mechanism 46 which, in turn, will actuate timer motor 48 for rotating the control drums 49. The rotating drums 49 serve as switches for actuating in appropriately timed sequence the motors M of inlet valve 12, the drainage valves 40a, 40b, and of an air pump 29a which operates air cylinder 29 to automatically perform the sequence of filter cleaning operations.

The actuation of the timer 46 by the differential pressure transmitter 41 first causes operation of the filter unit inlet valve 12 to close off the flow of feedwater to that filter unit, as by shunting the fluid into bypass line segment 10b as previously mentioned. If the outlet valve 13 of the filter unit is of a motorized stop valve type, rather than of an automatically operating check valve type, the timer 45 will then actuate the motor of that valve, as by electrical connection (as indicated by dotted lines in FIGURE 2) to close the outlet 16 of the filter unit in a manner such as will maintain the housing 14 substantially filled with the feedwater which it ordinarily filters. Of course, a conventional check valve would automatically serve the purpose. Further in sequence, the timer 46 causes the magnet rod hoist means, such as air cylinder 29, to withdraw the withdrawal plate 27 and consequently the magnet rods 21 from the tubes 17 to their respective positions as shown in FIGURE 4. It will be noted that the free-standing upper ends of the magnet rods 21 are not fully withdrawn from their respective tubes 17. Such is prevented by coacting stops 65, 66, the stop 65 being attached to the end of a guide rod 67 which projects from plate 27, and the stop 66 being one of two guide rod bearings which are attached to the exterior of housing 14 as indicated. Of course, an additional guide rod and bearing arrangement is provided on the opposite side (not shown) of housing 14 and plate 27. A limit switch 29b (FIGURES 3 and 4) may be provided to stop the motor M of air pump 29 at the appropriate time. Either subsequent to this downward movement of the withdrawal plate 27 or simultaneously therewith, the timer 46 actuates the motors M of the drainage valves 40a, 40b to permit drainage of the feedwater which has been isolated within the housing 14, as previously mentioned, through the drain lines 37a, 37b. Responding to magnetic attraction, the accumulated particles 50 will move downwardly along the rods 17 and with the draining feedwater to pass out of housing 14. After a time sufficient to permit the housing 14 to drain, the timer actuates the motor M of the air cylinder 29 in reverse direction which causes the magnet rods 21 to slide upwardly to their normal positions within the tubes 17 of the filter. A limit switch 29c serves to deactivate the motor M of pump 29 at the appropriate time, and stops 68 (FIGURES 3 and 4) insure that suitable space is provided between plate 27 and housing 14 for the flow of cooling air into or out of the tubes 17. The drainage valves 40a, 40b are closed, the outlet valve 13 will be opened (if not automatic), and the inlet valve 12 will be opened to permit the feedwater to again flow into and through the housing 14, all in sequence.

Thus, a filter apparatus and method has been described which achieves all of the objects of the invention.

What is claimed is:

1. Magnetic filter apparatus comprising a substantially enclosed housing having a fluid inlet opening and a fluid outlet opening and providing a fluid path between said inlet and outlet openings, non-magnetic hollow tube means projecting into and extending across such fluid path, said tube means being substantially vertically disposed and having a lower end extending through the bottom wall of said housing, and magnet means normally positioned within said tube means for establishing a magnetic field within such fluid path, said magnet means movably mounted with respect to said tube means for withdrawal in downward direction from that portion of said tube means which projects into such fluid path to a location below said housing whereby such magnetic field is removed from such fluid path.

2. Magnetic filter apparatus comprising a substantially enclosed housing having a fluid inlet opening and a fluid outlet opening and providing a fluid path between said inlet and outlet openings, non-magnetic hollow tube means projecting into and extending across such fluid path, said tube means being substantially vertically disposed and having a lower end extending through the bottom wall of said housing, magnet means normally positioned within said tube means for establishing a magnetic field within such fluid path, said magnet means movably mounted with respect to said tube means for withdrawal in downward direction from that portion of said tube means which projects into such fluid path to a location below said housing whereby such magnetic field is removed from such fluid path, and means providing spacing for fluid coolant between said magnet means when in such normal position and the interior surface of said non-magnetic tube means.

3. Magnetic filter apparatus according to claim 2 wherein the last said means comprises a plurality of spacer rods disposed annularly about and attached to the interior periphery of such interior surface of the tube means, said spacer rods extending substantially the length of said tube means.

4. Magnetic filter apparatus according to claim 2 wherein the last said means comprises a plurality of annularly disposed and longitudinally extending corrugations of the interior surface of said tube means, said corrugations extending substantially the length of said tube means.

5. Magnetic filter apparatus according to claim 2 wherein the last said means comprises second tube means concentrically within and peripherally spaced from said tube means, and peripherally corrugated third tube means concentrically within and attached to said second tube means, said second and third tube means extending substantially the length of said tube means, whereby spacing for fluid coolant is provided between said tube means and said second tube means and between said second tube means and said third tube means.

6. Magnetic filter apparatus comprising a substantially enclosed housing having a fluid inlet opening and a fluid outlet opening and providing a fluid path between said inlet and outlet openings, non-magnetic hollow tube means projecting into such fluid path, said tube means being substantially vertically disposed and having a lower end extending through the bottom wall of said housing, magnet means normally positioned within said tube means for establishing a magnetic field within such fluid path, said magnet means movably mounted with respect to said tube means for withdrawal in downward direction from that portion of said tube means which projects into such fluid path to a location below said housing whereby such magnetic field is removed from such fluid path, and means providing spacing for fluid coolant between said magnet means when in such normal position and the interior surface of said non-magnetic tube means, said tube means also having an upper end extending through another exterior wall of said housing.

7. Magnetic filter apparatus according to claim 6 wherein said non-magnetic tube means is substantially straight and extends between said housing bottom wall and the top wall of said housing, said upper and lower ends of the tube means being open to the atmosphere exterior of said housing.

8. Magnetic filter apparatus comprising a substantially enclosed housing including a top wall and a bottom wall and having a fluid inlet opening and a fluid outlet opening and providing a fluid path between said inlet and outlet openings, an inlet valve at said inlet opening, an outlet valve at said outlet opening, drain means in the bottom wall of said housing including drainage valve means, a plurality of non-magnetic hollow tubes projecting into and extending across such fluid path, said tubes being substantially vertically disposed in parallel spaced relationship with respect to each other and each having an open upper end extending through said top wall and an open lower end extending through said bottom wall of the housing, a magnet rod normally positioned within each of said tubes for establishing a magnetic field within such fluid path, said magnet rods mounted for slidable movement with respect to said tubes, each of said magnet rods having a lower end projecting from said lower end of its said associated tube, a magnet rod withdrawal plate, means connecting each of said projecting lower ends of the magnet rods to said withdrawal plate, and means for vertically moving said withdrawal plate downwardly to simultaneously withdraw all of said magnet rods from those portions of their said associated tubes which project into such fluid path to a location below said housing for removing such magnetic fields from such fluid path.

9. Magnetic filter apparatus according to claim 8 wherein said means connecting each of said projecting lower ends of the magnet rods to said withdrawal plate comprises universal joint means.

10. Magnetic filter apparatus according to claim 8 wherein each of said tubes is adapted to provide interior space for circulating cooling fluid along the length of and substantially surrounding its said associated magnet rod when positioned therewithin, and to provide an inlet opening to direct such cooling fluid into such space and an outlet opening to discharge such cooling fluid from such space, and wherein said apparatus further comprises means for introducing such cooling fluid through said inlet openings of the tubes.

11. Magnetic filter apparatus according to claim 10 wherein said means for introducing such cooling fluid comprises an air blower proximate said inlet openings of the tubes, and means for directing air from said blower into said inlet openings.

12. The method of cleaning out accumulations of magnetic particles from a magnetic type filter which includes vertically disposed non-magnetic tube means having its lower end open to the exterior of said filter, and magnet rod means normally positioned and slidable within said tube means, and an openable drain means at the bottom of the filter, comprising the steps of filling said filter with liquid, then sliding said magnet rod means substantially out from said lower end of the tube means, and opening said drain means to permit said liquid to flow by gravity therethrough and out of said filter.

References Cited in the file of this patent

UNITED STATES PATENTS

| | | |
|---|---|---|
| 1,335,955 | Cox | Apr. 6, 1920 |
| 2,358,612 | Acker | Sept. 19, 1944 |

FOREIGN PATENTS

| | | |
|---|---|---|
| 584,392 | Great Britain | Jan. 14, 1947 |
| 1,162,666 | France | Apr. 14, 1958 |